(12) United States Patent
Yu

(10) Patent No.: US 11,620,348 B1
(45) Date of Patent: Apr. 4, 2023

(54) SYSTEMS AND METHODS FOR PROVIDING TRENDING ENTITY INFORMATION

(71) Applicant: Meta Platforms, Inc., Menlo Park, CA (US)

(72) Inventor: Chien Yu, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 207 days.

(21) Appl. No.: 16/529,405

(22) Filed: Aug. 1, 2019

(51) Int. Cl.
*G06F 16/00* (2019.01)
*G06F 16/9536* (2019.01)
*G06Q 50/00* (2012.01)
*G06F 16/9537* (2019.01)

(52) U.S. Cl.
CPC ...... *G06F 16/9536* (2019.01); *G06F 16/9537* (2019.01); *G06Q 50/01* (2013.01)

(58) Field of Classification Search
CPC .. G06F 16/9536; G06F 16/9537; G06Q 50/01
See application file for complete search history.

(56) References Cited

U.S. PATENT DOCUMENTS

| | | | | |
|---|---|---|---|---|
| 10,311,362 | B1* | 6/2019 | Mirza | G06Q 10/10 |
| 2013/0074109 | A1* | 3/2013 | Skelton | H04N 21/252 725/14 |
| 2014/0032325 | A1* | 1/2014 | Weiss | G06Q 30/0261 705/14.58 |
| 2015/0264415 | A1* | 9/2015 | Hutchings | H04N 21/252 725/94 |
| 2016/0277802 | A1* | 9/2016 | Bernstein | H04N 21/4325 |
| 2017/0257410 | A1* | 9/2017 | Gattis | H04N 21/8455 |

* cited by examiner

*Primary Examiner* — Hung Q Pham
(74) *Attorney, Agent, or Firm* — Sheppard Mullin Richter & Hampton LLP

(57) ABSTRACT

Systems, methods, and non-transitory computer-readable media can obtain a plurality of input signals describing user activity associated with a plurality of entities. A respective amount of surge in user activity with each of the plurality of entities can be determined based on the plurality of input signals. The plurality of entities can be ranked based on their surges in user activity. Information describing one or more of the ranked entities can be provided as recommendations to one or more users.

23 Claims, 9 Drawing Sheets

SYSTEMS AND METHODS FOR PROVIDING TRENDING ENTITY INFORMATION

FIELD OF THE INVENTION

The present technology relates to the field of content provision. More particularly, the present technology relates to computerized techniques for determining and presenting trending entities in a content feed.

BACKGROUND

Today, people often utilize computing devices (or systems) for a wide variety of purposes. Users can use their computing devices to, for example, interact with one another, access content, share content, and create content. In some cases, content items can include postings from users participating in a social network. The postings may include text and media content items, such as images, graphical interchange formats (GIFs), videos, and audio. In some cases, the postings may also include user activities associated with entities, such as businesses, organizations, or offices. The postings may be published to the social network for consumption by others.

SUMMARY

Various embodiments of the present technology can include systems, methods, and non-transitory computer readable media configured to obtain a plurality of input signals describing user activity associated with a plurality of entities. A respective amount of surge in user activity with each of the plurality of entities can be determined based on the plurality of input signals. The plurality of entities can be ranked based on their surges in user activity. Information describing one or more of the ranked entities can be provided as recommendations to one or more users.

In some embodiments, the plurality of input signals describing user activity associated with the plurality of entities can include at least one of transaction data describing transactions that occurred at the entities, conversion data describing conversions that occurred by users interacting with pages associated with the entities, appointment data describing appointments created for the entities, place visit data describing geographic location data associated with the entities visited by users, page interaction data describing user interactions associated with the pages associated with the entities, check-in data describing user check-ins associated with the entities, mention data describing mentions received by content items relating to the entities, or user interaction data describing likes received by content items relating to the entities.

In some embodiments, the transaction data can be obtained from a third-party point of sale system. The appointment data can be obtained from a third-party appointment scheduling system. The check-in data can be obtained from a third-party check-in system.

In some embodiments, a subset of entities of the plurality of entities can be ranked. The subset of entities is within a threshold distance of a user.

In some embodiments, a subset of entities of the plurality of entities can be ranked. Entities included in the subset of entities can be associated with one or more same categories.

In some embodiments, user activity associated with an entity during a first time period can be determined based on at least one of the plurality of input signals. User activity associated with the entity during a second time period can be determined based on the at least one of the plurality of input signals. An amount of surge in user activity associated with the entity can be determined by measuring changes in user activity between the first and the second time periods.

In some embodiments, the first time period and the second time period are at least one of consecutive hours, same days in consecutive weeks, consecutive days in consecutive weeks, or consecutive weeks.

In some embodiments, user activity associated with an entity during a first time period can be determined based on a combination of the plurality of input signals. User activity associated with the entity during a second time period can be determined based on the combination of the plurality of input signals. An amount of surge in user activity associated with the entity can be determined by measuring changes in user activity between the first and the second time periods.

In some embodiments, various weights can be applied to the combination of the plurality of input signals. The weighted plurality of signals can be aggregated to generate a value that measures changes in user activity between the first and the second time periods.

In some embodiments, the information describing one or more of the ranked entities is provided to the one or more users in content feeds.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
FIG. 1 illustrates an example system, including an example content provider module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Trending Entity Information

People often utilize computing devices (or systems) for a wide variety of purposes. Users can use their computing devices to, for example, interact with one another, access content, share content, and create content. In some cases, content items can include postings from users participating in a social networking system. The postings may include text and media content items, such as images, graphical interchange formats (GIFs), videos, and audio. In some cases, the postings may also include user activities associated with entities, such as places, businesses, organizations, or offices. The postings may be published to the social networking system for consumption by others.

In general, a content provider (e.g., a social networking system) can provide users with access to various content items. For example, the content provider can provide users with access to content items through their content feeds. These content items may include pictures, video, posts, and/or other user generated content items. For example, content items (or posts) about a user's experiences with an entity can be made accessible to other users (e.g., friends of the user) through their content feeds. The entity may be a business (e.g., a restaurant, bar, coffee shop, etc.), an organization (e.g., a meetup group, club, etc.), or a place (e.g., a geographic location, point of interest, etc.), for example. In another example, content items relating to user check-ins at a geographic location associated with an entity can also be presented to other users (e.g., friends of the user) in their content feeds. In some instances, the content provider can provide suggestions (or recommendations) to users, for example, when various content items (e.g., posts, user generated content, etc.) are accessed. For example, a user can create a post relating to the user's dining experience at a particular restaurant. In this example, other users accessing the user's post can be provided with recommendations for other restaurants that are related to the particular restaurant. For example, the content provider can provide recommendations for other restaurants that are located nearby the particular restaurant. In another example, the content provider can provide recommendations for other restaurants that are associated with the same category (or categories) as the particular restaurant mentioned in the post. Such conventional recommendations tend to be static and fail to provide information that may be useful to users when evaluating entities to visit. For instance, conventional recommendations can fail to provide information describing surges in user activity at geographic locations associated with entities (or entity locations) for various periods of time. Such information can be useful to users who are interested in visiting entity locations that are trending among users. Similarly, such information can also be useful to users that are interested in avoiding entity locations that are trending among users. Accordingly, conventional approaches may not be effective in addressing these and other problems arising in computer technology.

An improved approach rooted in computer technology overcomes the foregoing and other disadvantages associated with conventional approaches specifically arising in the realm of computer technology. The disclosed technology can determine trending entities based on surges in user activity associated with entities (or entity locations). For example, the disclosed technology can determine trending entities at which user activity has surged between two periods of time (e.g., between a first hour and a second hour, a first day and a second day, a first week and a second week, etc.). In some embodiments, the disclosed technology can determine surges in user activity at a given entity upon evaluating a number of signals. These signals can include, for example, transactional data associated with the entity, conversion data associated with the entity, appointments booked for the entity, user visits to the entity, interactions with one or more pages associated with the entity, check-ins at the entity, mentions of the entity (e.g., mentions in posts or comments), and a number of user interactions with posts associated with the entity. In various embodiments, the disclosed technology can provide information describing trending entities to users of the social networking system as recommendations. In some embodiments, the trending entities can be ranked based on surges in user activity. One advantage of the disclosed technology allows local businesses (restaurants, salons, etc.) to drive real users to local businesses, and incentivize the businesses to apply creative ideas (grand openings, special discounts, themed days, viral entertainment, etc.) to generate surge effects. In contrast, conventional techniques keep rankings static and force businesses to pay a premium to be featured through online resources. The present technology creates a democratized opportunity for any business to come up with novel ideas to create sudden surges in activity/foot traffic and other types of user activity. More details describing the disclosed technology are provided below.

FIG. 1 illustrates an example system 100, including an example content provider module 102, according to an embodiment of the present technology. In some embodiments, the content provider module 102 can be implemented as whole or as part of a social networking system. As shown in the example of FIG. 1, the content provider module 102 can include a feed module 104, a location module 106, and a trending module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. In some instances, the content provider module 102 can be, in part or in whole, implemented within or configured to operate in conjunction or be integrated with a client computing device, such as the user device 610 of FIG. 6. The content provider module 102 can be implemented as or within a dedicated application (e.g., app), a program, or an applet running on a user computing device or client computing system. The application incorporating or implementing instructions for performing some, or all, functionality of the content provider module 102 can be created by a developer.

The application can be provided to or maintained in a repository. In some cases, the application can be uploaded or otherwise transmitted over a network (e.g., Internet) to the repository. For example, a computing system (e.g., server)

associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In some embodiments, the content provider module 102 can be configured to communicate and/or operate with the at least one data store 110, as shown in the example system 100. The at least one data store 110 can be configured to store and maintain various types of data. For example, the at least one data store 110 can store information describing various content that has been viewed, accessed, consumed, modified, or created by user or third party entities of the social networking system. In some implementations, the at least one data store 110 can store information associated with the social networking system (e.g., the social networking system 630 of FIG. 6). The information associated with the social networking system can include data about users, third party entities, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users or third party entities, such as user or third party entity identifiers, user or third party entity information, profile information, user or third party entity specified settings, content produced or posted by users or third party entities, and various other types of user or third party entity data.

The feed module 104 can be configured to provide access to content items to a user through a content feed. The content items may include pictures, video, posts, and/or other user generated content items. The user generated content items can include, for example, check-in posts generated when another user (e.g., a friend of the user) performs a check-in operation at an entity location. In another example, user generated content items can include posts generated when another user shares a post or mentions an entity in a post. In some embodiments, the content feed can include content items from other users in the social networking system. For example, pictures, video, or posts from users that are friends of the user can be included in the user's content feed. In some embodiments, the feed module 104 can provide suggestions (or recommendations) with content items included in the user's content feed. For example, a friend connected to the user can check into an entity (e.g., a coffee shop) during lunchtime using a check-in feature of the social networking system. A post describing the friend's check-in can be shown in the content feed of the user. In this example, the feed module 104 can also provide a list of recommended entities (e.g., other coffee shops) along with the post. The entities included in the list may be selected based on various considerations, as described below. In some embodiments, the user can interact with entity recommendations shown in the content feed. For example, the user can select, press, touch, or otherwise interact with an entity recommendation to obtain further information regarding the selected entity. Such information can include, for example, hours of operation, types of payment accepted (e.g., cash, checks, credit cards, etc.), items or services being offered by the selected entity, etc.

The location module 106 can be configured to determine a geographic location of a user accessing content from the social networking system. In various embodiments, the location module 106 can obtain location data corresponding to the user using generally known techniques. For example, user location data (e.g., GPS information) can be obtained from a computing device through which the user is accessing the social networking system. In some embodiments, user location data determined by the location module 106 can be used to determine entities to be provided as recommendations. For example, a friend of a user can check into a hamburger restaurant using the check-in feature of the social networking system. This check-in can appear as a content item in the user's content feed. In this example, location information determined for the user by the location module 106 can be used by the trending module 108 to identify other entities that can be provided as recommendations to the user based on the user's current location, as described below.

The trending module 108 can be configured to identify entities (e.g., places, businesses, organizations, offices, etc.) that are trending (e.g., popular, surging) in the social networking system based on user activity occurring at geographic locations associated with the entities. In various embodiments, the trending module 108 can interact with the feed module 104 to provide trending entities as recommendations to users. In general, entities that are determined to be trending can be experiencing some amount (or a threshold amount) of surge in user activity during some period of time (e.g., hour, day, week, morning, afternoon, evening, etc.). In some embodiments, the trending module 108 can identify trending entities by obtaining and aggregating a plurality of input signals from the social networking system. Based on one or a combination of the plurality of input signals, the trending module 108 can determine an amount of surge in user activity associated with each respective entity. The trending module 108 can rank the trending entities based on their surge amounts. For example, a business that experienced a thirty percent increase in user activity during some period of time (e.g., a period of time that spans 11:30 am to 1:30 pm) can be ranked first, a business that experienced a twenty percent increase in user visits during the period of time can be ranked second, a business that experienced a zero percent increase in user visits during the period of time can be ranked third, and so on. In some embodiments, the trending module 108 can rank the trending entities in real-time (or near real-time) as various input signals are received or determined. More details describing the trending module 108 will be discussed below with respect to FIG. 2A.

Figure 2A:
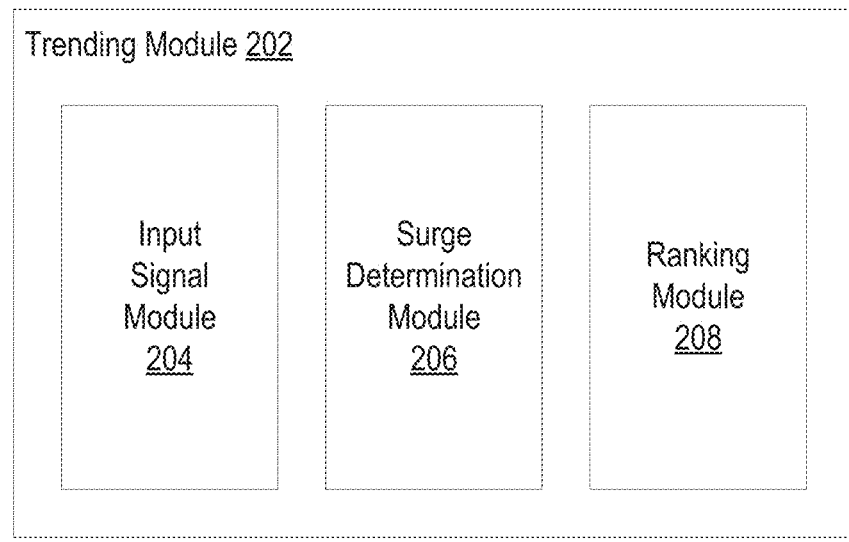
FIG. 2A illustrates an example trending module, according to an embodiment of the present technology.

FIG. 2A illustrates an example trending module 202, according to an embodiment of the present technology. In some embodiments, the trending module 108 of FIG. 1 can be implemented as the trending module 202. As discussed, the trending module 202 can identify entities that are currently trending in a social networking system. As shown in FIG. 2A, the trending module 202 can include an input signal module 204, a surge determination module 206, and a ranking module 208.

The input signal module 204 can be configured to obtain a plurality of input signals describing user activity associated with entities. In general, the plurality of input signals can be data managed or obtainable by the social networking system. For example, the plurality of input signals can include data relating to a number of transactions associated with an entity, actions taken by users on pages associated with the entity that led to a conversion, appointments booked for the entity, a number of times users visited a geographic location associated with the entity, user interactions with pages associated with the entity, a number of check-ins by users at a geographic location associated with the entity, a number of times the entity is mentioned in content items (e.g., posts), and a number of user interactions (e.g., likes, comments, shares, etc.) that were received for content items (e.g., posts) relating to the entity. In some embodiments, the plurality of input signals can also include data collected from third-party services or systems. More details describing the input signal module 204 will be discussed below with respect to FIG. 2B.

The surge determination module 206 can be configured to determine an amount of surge in user activity associated with an entity. In various embodiments, the amount of surge in user activity can be determined by measuring changes in user activity at a geographic location associated with the entity. For example, user activity at a restaurant may increase from a first period of time (e.g., hour, day, week, morning, afternoon, evening, or some other defined period of time) to a second period of time. For example, the restaurant may experience an increase in user activity from a week ago. In this example, an amount of surge is the amount of increase in user activity from the previous week. In some embodiments, the surge determination module 206 can determine an amount of surge in user activity based on one or more input signals. For example, the surge determination module 206 can process transaction data associated with an entity to determine an amount of surge in user activity associated with the entity between two time periods. For example, during a first time period, a number of transactions at an entity location (e.g., a restaurant) can be forty transactions. Further, during a second time period, a number of transactions at the entity location can be eighty transactions. In this example, the amount of surge is twofold (or a one hundred percent increase) between the first and second time periods. In some embodiments, the first and second time periods used to measure user activity can be defined by any suitable time period. For example, the first time period may correspond to a first portion of a day (e.g., an hour or span of hours) and the second time period may correspond to a second portion of the day (e.g., a subsequent hour or span of hours). In another example, the first time period and the second time period may be two consecutive days in a week (e.g., Monday-Tuesday, Tuesday-Wednesday, Wednesday-Thursday, etc.). In yet another example, the first time period and the second time period may be the same days in two consecutive weeks (e.g., Monday of a first week and Monday of a second week) or two consecutive weeks (e.g., a first week and a subsequent second week). Many variations are possible. In general, the surge determination module 206 may use any one of the plurality of input signals to determine an amount of surge in user activity. For example, the surge determination module 206 can process appointment data obtained by the input signal module 204 to determine the amount of surge in user activity. For example, a number of appointments booked at an entity location (e.g., a restaurant) between two time periods may be different. Based on this information, the surge determination module 206 can determine the amount of surge in user activity at the entity location between the two time periods. In some embodiments, the surge determination module 206 can determine an amount of surge in user activity associated with an entity based on a combination of the plurality input signals. In such embodiments, the plurality of input signals can be aggregated (or combined) to determine a score or value that measures user activity based on the various input signals. For example, the surge determination module 206 can process transaction and appointment data associated with an entity to determine an amount of surge associated with the entity for any two time periods. In some embodiments, the surge determination module 206 can apply weights to input signals when more than one input signal are aggregated and used to determine an amount of surge in user activity. For example, the surge determination module 206 may apply a first weight (e.g., 0.7) to transaction data and a second weight (e.g., 0.3) to appointment data when both input signals are aggregated and used to determine an amount of surge in user activity associated with an entity. Many variations are possible.

The ranking module 208 can be configured to rank entities based on surges in user activity associated with the entities. For example, in some embodiments, the ranking module 208 can rank the entities so that entities experiencing large amounts of surges in user activity are ranked higher than entities that experience small amounts of surges during some time period. For instance, the ranking module 208 can rank a business that saw a largest increase in user activity from a week ago (or two weeks ago, or a month ago, etc.) as number one in the ranking, a business that saw a second largest increase in user activity increase from a week ago as number two in the ranking, and so on. In some embodiments, the ranking module 208 can perform the ranking dynamically, in real-time, as additional input signals are determined or received by the social networking system. In some embodiments, the ranking module 208 can rank particular segments (or categories) of entities. For example, the ranking module 208 can create a ranking for entities that are restaurants, a ranking for entities that are hair salons, and a ranking for entities that are nail salons based on surges in user activity relating to segments to which the entities belong. Many variations are possible. In some embodiments, ranked entities that satisfy a threshold can be considered trending entities and provided to a user, in ranked order, in the user's content feed as suggestions or recommendations, as described above. In some embodiments, the threshold can be determined based on population of a geographic area (e.g., a town, a city, a metropolitan area, etc.) or based on a number of entities in a geographic area. The threshold can be selected to provide a long enough time period so that a user is not presented with repeats of the same entities. For instance, the threshold can be selected so that, for example, if a town has only three restaurants, then the same three restaurants will not always be presented to a user based on surges, thus enhancing user experience. The present technology thus achieves an objective of showing "fresh" content to users. In some embodiments, the geographical area can be dynamically expanded to include entities over a greater geographic area.

Figure 2B:
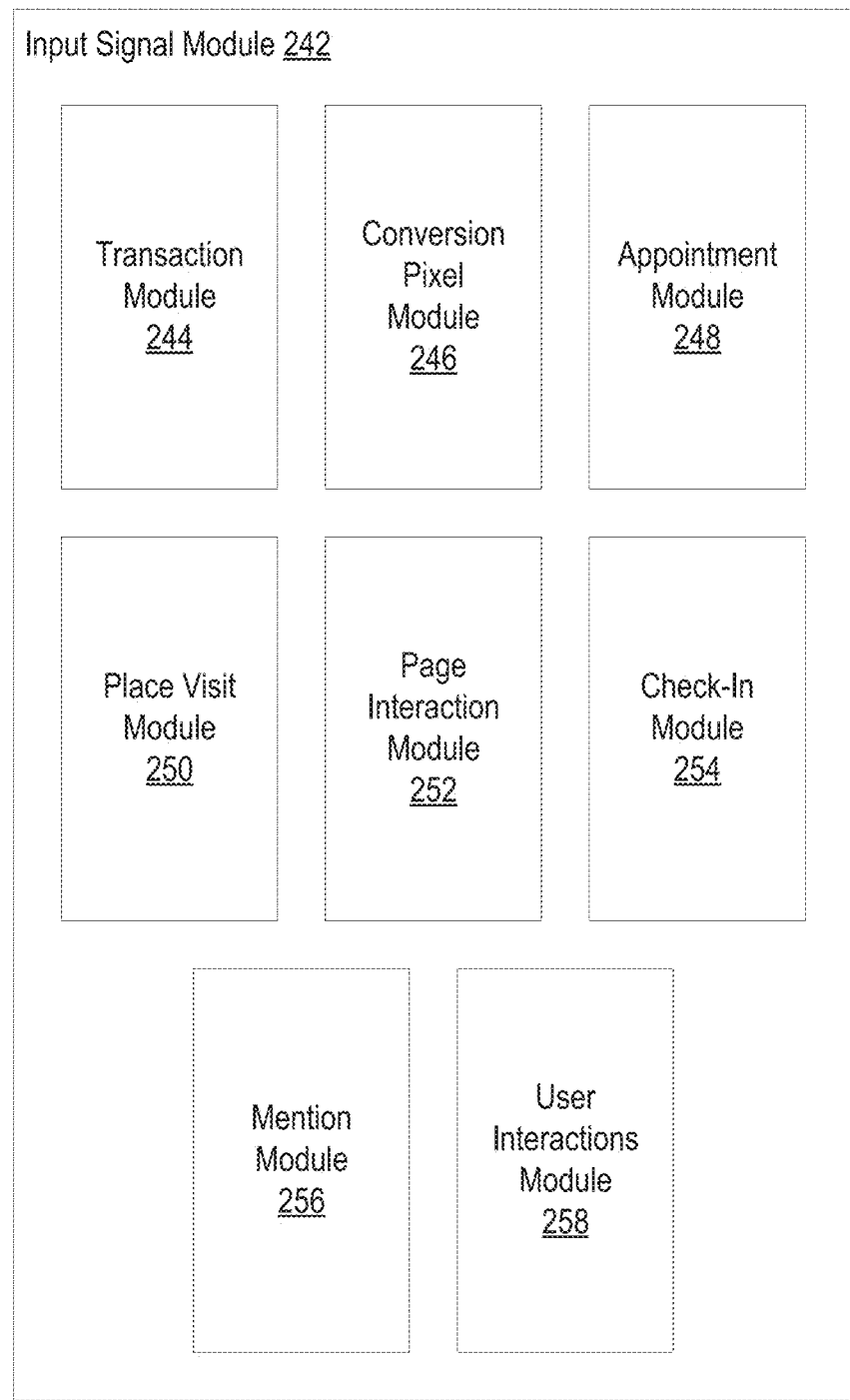
FIG. 2B illustrates an example input signal module, according to an embodiment of the present technology.

FIG. 2B illustrates an example input signal module 242, according to an embodiment of the present technology. In some embodiments, the input signal module 204 of FIG. 2A can be implemented as the input signal module 242. As discussed, the input signal module 242 can obtain a plurality of input signals associated with entities. As shown in FIG. 2B, the input signal module 242 can include a transaction module 244, a conversion pixel module 246, an appointment module 248, a place visit module 250, a page interaction module 252, a check-in module 254, a mention module 256, and a user interactions module 258. The input signal module 242 can include modules relating to other types of input signals. Many variations are possible.

The transaction module 244 can be configured to obtain transaction data associated with users of the social networking system and entities. In various embodiments, the transaction data associated with the users can be obtained from third-party point of sale systems using generally known techniques. The third-party point of sale systems can be tasked with performing transactions at the entities (e.g., purchases, exchanges, returns, etc.). In some embodiments, the transaction module 244 can obtain the transaction data based on an application programing interface (API) provided by the third-party point of sale systems. Many variations are possible.

The conversion pixel module 246 can be configured to track user actions on pages (e.g., web pages or social network pages) associated with entities that lead to conversions. In various embodiments, a conversion can be defined as any desired action performed by a user, such as completing a purchase, signing up for a newsletter, submitting an email address, or any other activity defined by administrators of the pages associated with the entities. In general, the conversion pixel module 246 measures an effectiveness of the pages in directing users to complete specific actions on the pages. In various embodiments, the conversion pixel module 246 can maintain conversion information for entities. For example, the conversion pixel module 246 can maintain a count of conversions that resulted from users interacting with a page associated with an entity during some period of time. Many variations are possible.

The appointment module 248 can be configured to obtain appointment data. For example, the appointment module 248 can obtain a count of appointments that were made with a given entity by users of the social networking system. For example, an appointment can include a time scheduled by a user to visit a location associated with an entity to receive a service or product. In various embodiments, the appointment data can be obtained from third-party appointment scheduling systems. The third-party appointment scheduling systems can be responsible for scheduling appointments for users with entities, for example, over the internet. In some embodiments, the appointment module 248 can obtain the appointment data associated with the users using an API provided by the third-party appointment systems. Many variations are possible.

The place visit module 250 can be configured to obtain geographic location data associated with places visited by the users of the social networking system. In some embodiments, location data associated with a user can be obtained from a computing device of the user through which the user accesses content from the social networking system. This location data can be used by the place visit module 250 to determine places that the user has visited and a number of times the user visited each place during some period of time.

The page interaction module 252 can be configured to obtain user interaction data associated with pages of entities. In various embodiments, entities may have pages (e.g., websites, web page, a social network page, etc.) that users can access through the social networking system. The page interaction module 252 can monitor user interactions on the pages through the social networking system. The interaction data can include, for example, a count of interactions, types of interactions (e.g., likes, comments, shares, etc.), and time spent on a page associated with an entity, to name some examples. Many variations are possible.

The check-in module 254 can be configured to determine user check-in information. The check-in information can indicate geographic locations of entities at which a user has checked in, when the user checked in at an entity, and a number of times the user has checked in at an entity, to name some examples. In various embodiments, the social networking system can provide an option for a user to check in at an entity. In such embodiments, the social networking system can determine user check-in information for various entities. In some embodiments, the user check-in data can be obtained from third-party check-in systems. The third-party check-in systems can be separate from the social networking system and can be responsible for tracking user check-ins at geographic locations associated with entities. In some embodiments, the check-in module 254 can obtain the user check-in data using an API provided by the third-party check-in systems.

The mention module 256 can be configured to determine a number of mentions by users of entities in relation to content items (e.g., a post) in the social networking system. For example, a mention may be a tag or an indication that identifies an entity in a post. In various embodiments, a mention may be indicated by an "at" sign (e.g., "@") or a hashtag (e.g., "#") in a post. In various embodiments, a user may post content items relating to entities on the social networking system. These content items can be presented to users of the social networking system as content items in which a particular entity of interest is mentioned.

The user interactions module 258 can be configured to determine a number of likes, comments, and/or shares received on the social networking system in relation to a content item (e.g., a post) associated with an entity. Various content items relating to entities on the social networking system may be posted. These content items can be presented to users of the social networking system and the users can like, comment on, or share the content items.

Figure 3:
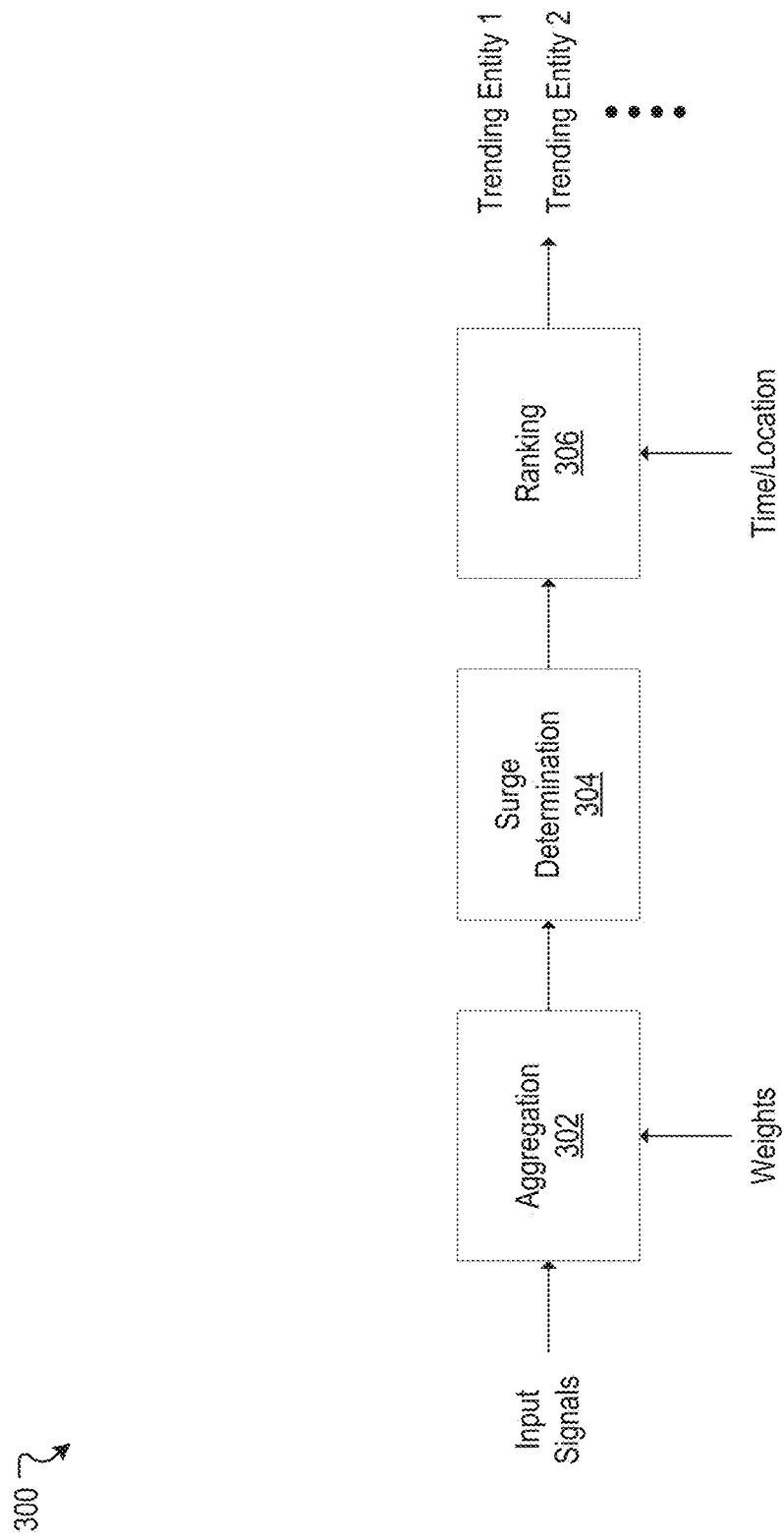
FIG. 3 illustrates an example functional block diagram, according to an embodiment of the present technology.

FIG. 3 illustrates an example functional block diagram 300, according to an embodiment of the present technology. The functionality described in 300 is supported by the content provider module 102 of FIG. 1. Input signals are provided for aggregation at block 302. The input signals, in various embodiments, can include data relating to a number of transactions associated with an entity, actions taken by users on pages associated with the entity that led to a conversion, appointments booked for the entity, a number of times users visited a geographic location associated with the entity, user interactions with pages associated with the entity, a number of check-ins by users at a geographic location associated with the entity, a number of times the entity is mentioned in content items (e.g., posts), and a number of user interactions (e.g., likes, comments, shares, etc.) that were received for content items (e.g., posts) relating to the entity. Other types of input signals are possible. In some cases, the input signals can be aggregated at block 302 to determine a score or value that measures user activity associated with the entity. In some embodiments, a weight can be provided for each individual input signal to assign an associated level of importance to each input signal during aggregation. At block 304, surge determination is performed. Surges associated with entities can be determined by calculating an amount of surge in user activity associated with an entity based on one or a combination of input signals. For example, user activity at an entity may be determined using a number of transactions at that entity. For instance, the number of transactions at the entity may increase from a first period of time to a second period of time by forty percent. This forty percent increase is the amount of surge between the two periods of time. In some cases, another input signal, such as the number of check-in, can be used for surge determination. In some cases, a combination of input signals, such as the number of transactions plus the number of check-ins, can be used for surge determination. At block 306, entities are ranked based on their respective amounts of surge in user activity. The amounts of surge can be based on a comparison of different time periods, such as comparing user activity between two consecutive hours, days, weeks or months. In some cases, the amounts of surge can be based on a comparison of user activity between the same hours in consecutive days (e.g., between 11 am to 1 pm of a Monday of a given week and 11 am to 1 pm of a Tuesday of that week) or between the same days in consecutive weeks. Many variations are possible. In some embodiments, time and location data associated with a user to whom recommendations are to be provided can be utilized in the ranking of entities. In some instances, time and location data of the user can be utilized to further narrow the identification of entities. For example, the identification of entities can be further narrowed to show entities that experienced a large amount of surge during a time period that corresponds to a current time of the user. In some cases, the identification of entities can be further narrowed to show only entities that are within a threshold distance of the user's current location. In the example functional block diagram 300, entities are ranked based on their respective surge amounts during a time period (e.g., hour, day, week, etc.). The ranking of entities can result in an identification of one or more entities that satisfy a threshold surge value based on the respective surge amounts associated with the entities. The one or more entities can be provided to the user in the user's content feed, for example, as a list of suggested (or recommended) trending entities. Each of the trending entities included in this list can be selected by the user to learn more details about the trending entity. In some cases, the ranking of entities may change based on time of day. For example, a trending entity 1 may experience a larger amount of surge in the evening than in the afternoon and a trending entity 2 may experience a larger amount of surge in the afternoon than in the evening. In this example, the trending entity 1 may be ranked higher than the trending entity 2 when the entities are provided, as selectable recommendations, to the user in the evening. Similarly, the trending entity 2 may be ranked higher than the trending entity 1 when the entities are provided, as selectable recommendations, to the user in the afternoon. In some cases, the ranking of entities may change based on the user's current location. For example, the trending entity 2 may be outside of some threshold distance from the user's location and thus may not be relevant to the user. In this example, the ranking of entities may exclude the trending entity 2 from the ranking. Many variations are possible.

Figure 4A:
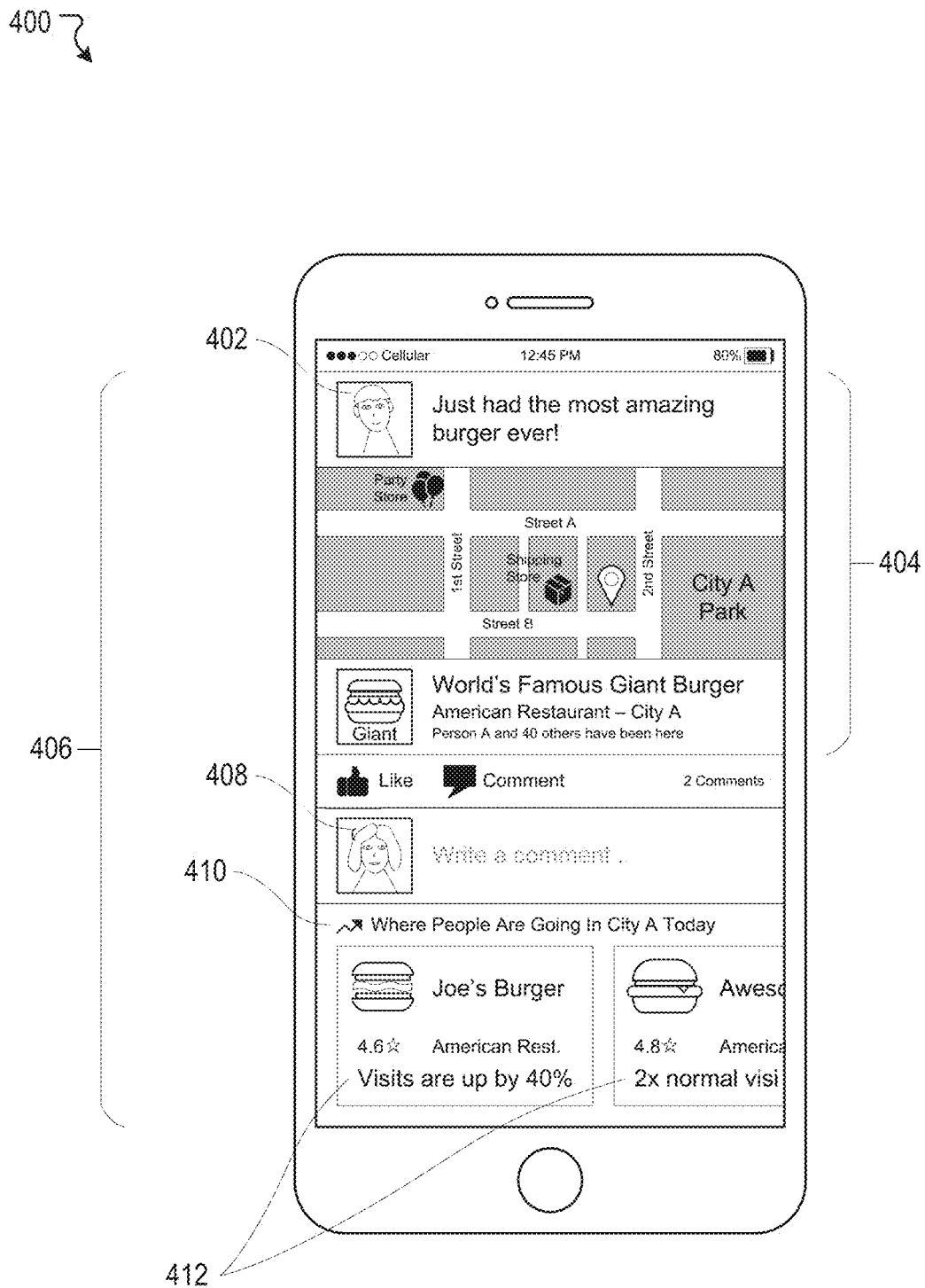
FIG. 4A illustrates an example diagram, according to an embodiment of the present technology.

FIG. 4A illustrates an example diagram 400, according to an embodiment of the present technology. This example diagram 400 depicts a scenario supported by the content provider module 102 (e.g., a social networking system) in which a first user 402 posts a content item 404 that is presented in a content feed 406 of a second user 408 in the social networking system. As depicted in the example diagram 400, the content item 404 describes a lunchtime experience of the first user 402 at a restaurant (e.g., "World's Famous Giant Burger"). In some embodiments, when providing the content item 404 for display, the social networking system can also provide recommendations 410 for other similar entities (e.g., "Joe's Burger") that are trending. In some embodiments, the recommended entities 410 can be filtered to exclude entities that exceed a threshold distance from the second user 408. In some embodiments, the recommended entities 410 can be ranked based on a surge in user activity associated with each entity. In some embodiments, an amount of surge 412 experienced by an entity can be expressed as a percentage increase from a previous time period.

Figure 4B:
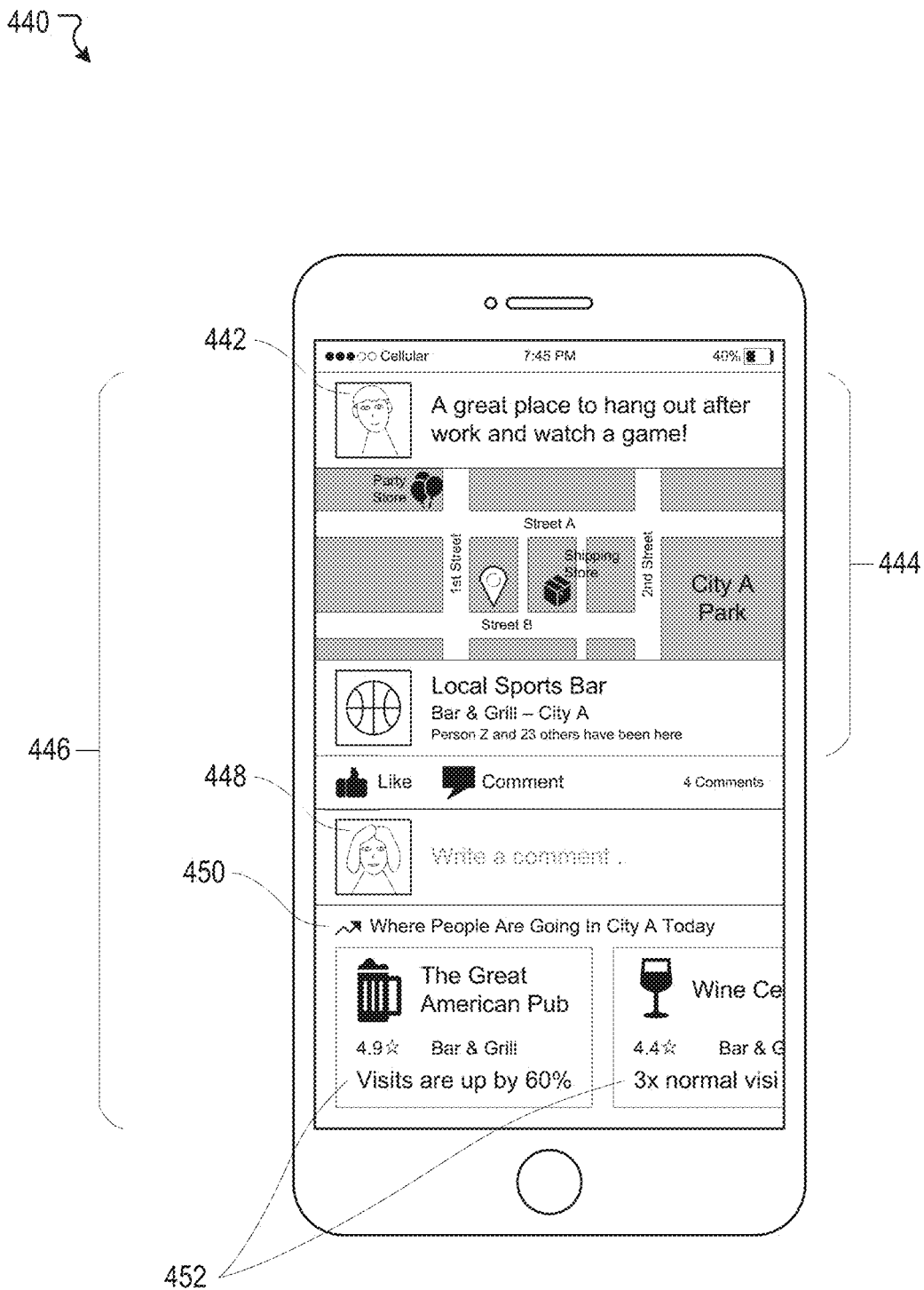
FIG. 4B illustrates another example diagram, according to an embodiment of the present technology.

FIG. 4B illustrates another example diagram 440, according to an embodiment of the present technology. This example diagram 440 depicts a scenario supported by the content provider module 102 (e.g., a social networking system) in which a first user 442 posts a content item 444 that is presented in a content feed 446 of a second user 448 in the social networking system. As depicted in the example diagram 440, the content item 444 describes an evening experience of the first user 442 at a bar (e.g., "Local Sports Bar"). In some embodiments, when providing the content item 444 for display, the social networking system can also provide recommendations 450 for other similar entities (e.g., "The Great American Pub") that are trending. In this example, because the second user 448 is accessing the social networking system in an evening time (e.g., at 7:45 pm as shown), providing recommendations of eateries may no longer be relevant to the second user 448. Instead, the social networking system can provide more relevant recommendations such as other bars, pubs, or wine bars to the second user 448. In some embodiments, the recommended entities 450 can be filtered to exclude entities that exceed a threshold distance from the second user 448. In some embodiments, the recommended entities 450 can be ranked based on a surge in user activity associated with each entity. In some embodiments, an amount of surge in user activity 452 can be expressed as a percentage increase from a previous time period.

Figure 5:
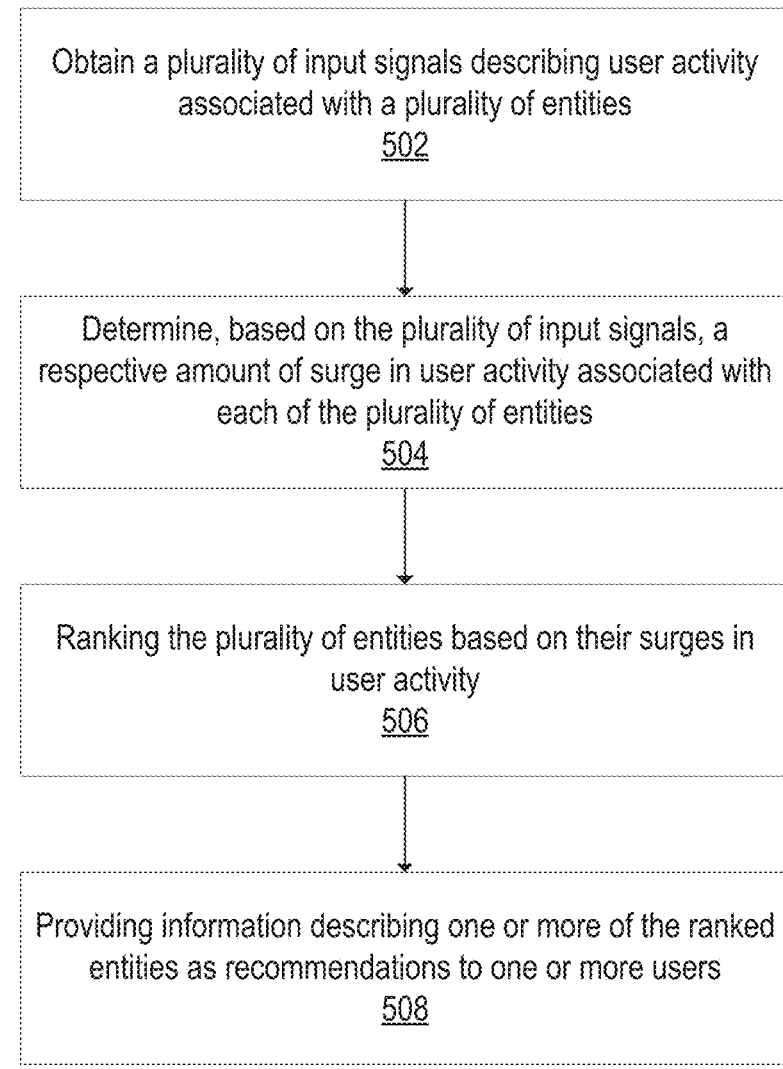
FIG. 5 illustrates an example method, according to an embodiment of the present technology.

FIG. 5 illustrates an example method, according to an embodiment of the present technology. It should be appreciated that there can be additional, fewer, or alternative steps performed in similar or alternative orders, or in parallel, within the scope of the various embodiments discussed herein unless otherwise stated.

At block 502, a plurality of input signals describing user activity associated with a plurality of entities can be obtained. At block 504, a respective amount of surge in user activity with each of the plurality of entities can be determined based on the plurality of input signals. At block 506, the plurality of entities can be ranked based on their surges in user activity. At block 508, information describing one or more of the ranked entities can be provided as recommendations to one or more users.

It is contemplated that there can be many other uses, applications, and/or variations associated with the various embodiments of the present technology. For example, in some cases, user can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 6:
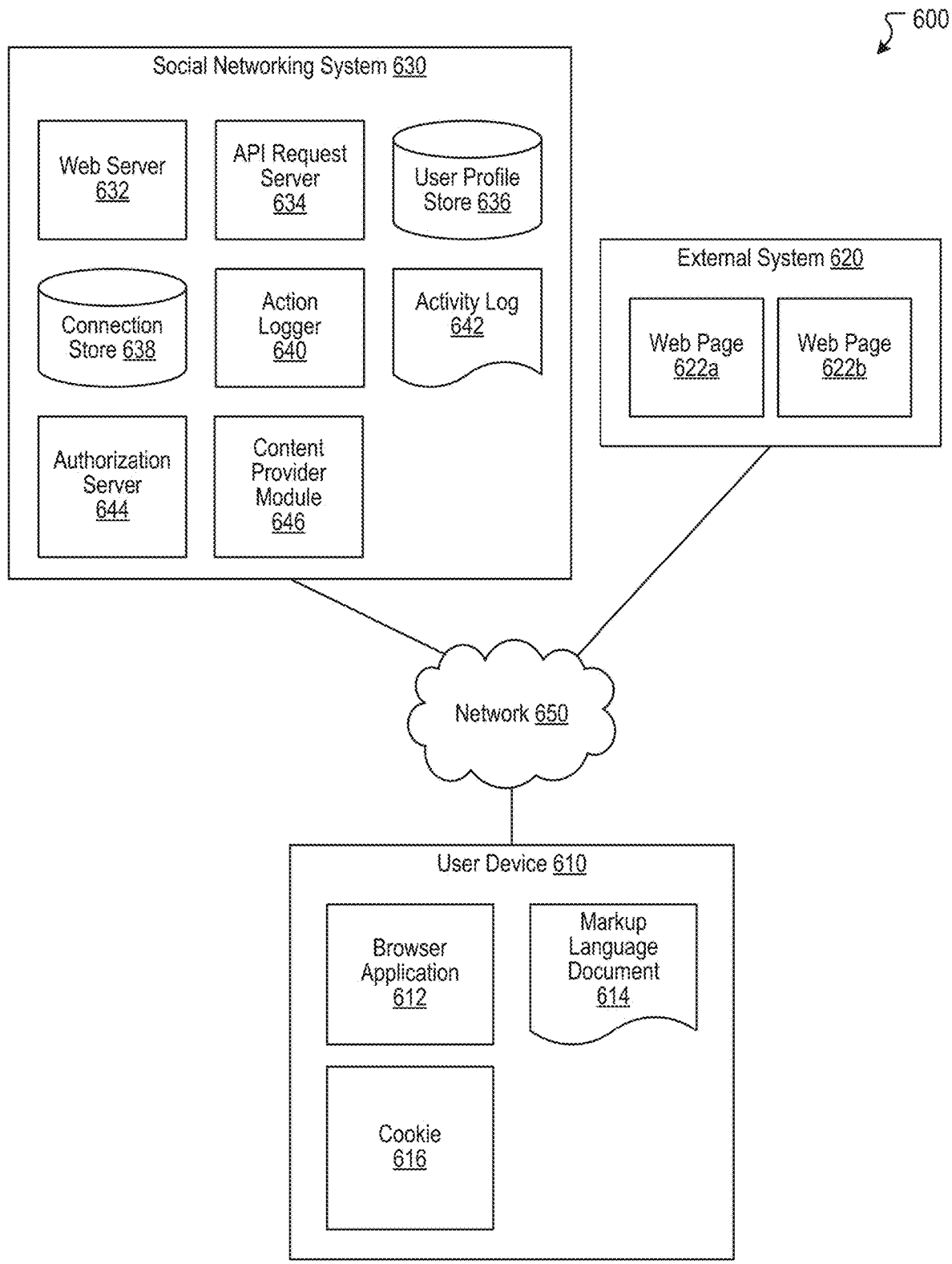
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 655. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, media content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and media content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can be implemented with the content provider module 102 of FIG. 1. In some embodiments, one or more functionalities of the content provider module 646 can also be implemented in the user device 610.

Hardware Implementation

Figure 7:
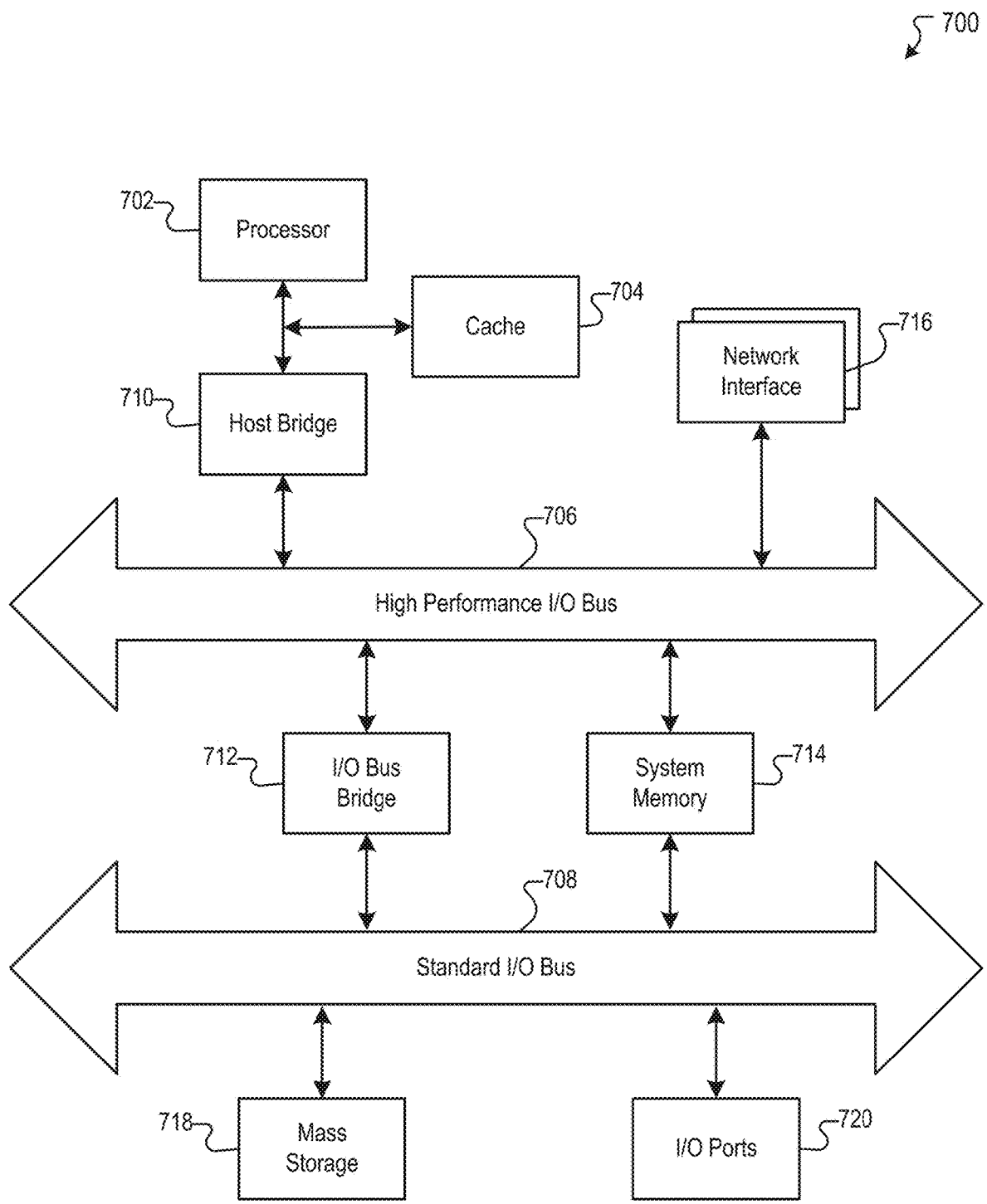
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, a plurality of input signals describing user activity associated with a plurality of businesses, wherein the plurality of input signals comprise transaction data describing transactions that occurred at locations of the plurality of businesses and conversion data describing conversions that occurred by user interactions with pages of a networking system associated with the plurality of businesses;
   determining, by the computing system, based on the plurality of input signals, a respective amount of surge in user activity associated with each respective business of the plurality of businesses, the respective amount of surge associated with the respective business is determined based on an aggregation of input signals including transaction data and conversion data associated with the respective business, wherein the respective amount of surge is indicative of an increase in measured user activity between two time periods; and based on a subset of businesses of the plurality of businesses that are associated with amounts of surge that satisfy a threshold surge value, providing, by the computing system, recommendations of the subset of businesses to one or more users, the threshold surge value based at least in part on a number of businesses in a geographic area of the subset of business.

2. The computer-implemented method of claim 1, wherein the plurality of input signals describing user activity associated with the plurality of businesses further comprise at least one of place visit data describing geographic location data associated with the plurality of businesses visited by users, check-in data describing user check-ins associated with the plurality of businesses, mention data describing mentions received by content items relating to the plurality of businesses, or user interaction data describing likes received by content items relating to the plurality of businesses.

3. The computer-implemented method of claim 1, wherein the subset of businesses of the plurality of businesses that are associated with amounts of surge that satisfy the threshold surge value includes businesses within a threshold distance of a user.

4. The computer-implemented method of claim 1, wherein the subset of businesses includes businesses associated with one or more same categories.

5. The computer-implemented method of claim 1, wherein determining, based on the plurality of input signals, the respective amount of surge in user activity associated with each of the plurality of businesses comprises:

determining, based on at least one of the plurality of input signals, user activity associated with a business during a first time period;

determining, based on the at least one of the plurality of input signals, user activity associated with the business during a second time period; and determining an amount of surge in user activity associated with the business by measuring changes in user activity between the first and the second time periods.

6. The computer-implemented method of claim 5, wherein the first time period and the second time period are at least one of consecutive hours, same days in consecutive weeks, consecutive days in consecutive weeks, or consecutive weeks.

7. The computer-implemented method of claim 1, wherein determining, based on the plurality of input signals, the respective amount of surge in user activity associated with each of the plurality of businesses comprises:

determining, based on at least two of the plurality of input signals, user activity associated with a business during a first time period;

determining, based on the at least two of the plurality of input signals, user activity associated with the business during a second time period; and determining an amount of surge in user activity associated with the business by measuring changes in user activity between the first and the second time periods.

8. The computer-implemented method of claim 7, further comprises:

applying weights to the at least two of the plurality of input signals; and aggregating the weighted input signals to generate a value that measures changes in user activity between the first and the second time periods.

9. The computer-implemented method of claim 1, wherein information describing the subset of businesses is provided to the one or more users in content feeds.

10. The computer-implemented method of claim 1, wherein the plurality of input signals describing user activity associated with the plurality of businesses include page interaction data describing user interactions associated with pages associated with the plurality of businesses.

11. The computer-implemented method of claim 1, wherein the plurality of input signals describing user activity associated with the plurality of businesses user activity further comprise appointment data describing appointments created for the plurality of businesses.

12. The computer-implemented method of claim 11, wherein the transaction data is obtained from a third-party point of sale system, wherein the appointment data is obtained from a third-party appointment scheduling system, and wherein the check-in data is obtained from a third-party check-in system.

13. The computer-implemented method of claim 1, wherein the conversions are purchases.

14. A computing system comprising:

at least one processor; and a memory storing instructions that, when executed by the at least one processor, cause the computing system to perform:

obtaining, by a computing system, a plurality of input signals describing user activity associated with a plurality of businesses, wherein the plurality of input signals comprise transaction data describing transactions that occurred at locations of the plurality of businesses and conversion data describing conversions that occurred by user interactions with pages of a networking system associated with the plurality of businesses;

determining, by the computing system, based on the plurality of input signals, a respective amount of surge in user activity associated with each respective business of the plurality of businesses, the respective amount of surge associated with the respective business is determined based on an aggregation of input signals including transaction data and conversion data associated with the respective business, wherein the respective amount of surge is indicative of an increase in measured user activity between two time periods; and based on a subset of businesses of the plurality of businesses that are associated with amounts of surge that satisfy a threshold surge value, providing, by the computing system, recommendations of the subset of businesses to one or more users, the threshold surge value based at least in part on a number of businesses in a geographic area of the subset of business.

15. The computing system of claim 14, wherein the plurality of input signals describing user activity associated with the plurality of businesses further comprise at least one of appointment data describing appointments created for the plurality of businesses, place visit data describing geographic location data associated with the plurality of businesses visited by users, page interaction data describing user interactions associated with the pages associated with the plurality of businesses, check-in data describing user check-ins associated with the plurality of businesses, mention data describing mentions received by content items relating to the plurality of businesses, or user interaction data describing likes received by content items relating to the plurality of businesses.

16. The computing system of claim 15, wherein the transaction data is obtained from a third-party point of sale system, wherein the appointment data is obtained from a third-party appointment scheduling system, and wherein the check-in data is obtained from a third-party check-in system.

17. The computing system of claim 14, wherein the subset of businesses of the plurality of businesses that are associated with amounts of surge that satisfy the threshold surge value includes businesses within a threshold distance of a user.

18. The computing system of claim 10, wherein the subset of businesses includes businesses associated with one or more same categories.

19. A non-transitory computer-readable storage medium including instructions that, when executed by at least one processor of a computing system, cause a computing system to perform a method comprising:
  obtaining, by a computing system, a plurality of input signals describing user activity associated with a plurality of businesses, wherein the plurality of input signals comprise transaction data describing transactions that occurred at locations of the plurality of businesses and conversion data describing conversions that occurred by user interactions with pages of a networking system associated with the plurality of businesses;
  determining, by the computing system, based on the plurality of input signals, a respective amount of surge in user activity associated with each respective business of the plurality of businesses, the respective amount of surge associated with the respective business is determined based on an aggregation of input signals including transaction data and conversion data associated with the respective business, wherein the respective amount of surge is indicative of an increase in measured user activity between two time periods; and
  based on a subset of businesses of the plurality of businesses that are associated with amounts of surge that satisfy a threshold surge value, providing, by the computing system, recommendations of the subset of businesses to one or more users, the threshold surge value based at least in part on a number of businesses in a geographic area of the subset of business.

20. The non-transitory computer-readable storage medium of claim 19, wherein the plurality of input signals describing user activity associated with the plurality of businesses further comprise at least one of appointment data describing appointments created for the plurality of businesses, place visit data describing geographic location data associated with the plurality of businesses visited by users, page interaction data describing user interactions associated with the pages associated with the plurality of businesses, check-in data describing user check-ins associated with the plurality of businesses, mention data describing mentions received by content items relating to the plurality of businesses, or user interaction data describing likes received by content items relating to the plurality of businesses.

21. The non-transitory computer-readable storage medium of claim 20, wherein the transaction data is obtained from a third-party point of sale system, wherein the appointment data is obtained from a third-party appointment scheduling system, and wherein the check-in data is obtained from a third-party check-in system.

22. The non-transitory computer-readable storage medium of claim 19, wherein the subset of businesses of the plurality of businesses that are associated with amounts of surge that satisfy the threshold surge value includes businesses within a threshold distance of a user.

23. The non-transitory computer-readable storage medium of claim 19, wherein the subset of businesses includes businesses associated with one or more same categories.

\* \* \* \* \*